US009542730B2

(12) United States Patent
Yamada

(10) Patent No.: US 9,542,730 B2
(45) Date of Patent: Jan. 10, 2017

(54) IMAGE PROCESSING DEVICE, IMAGE PROCESSING METHOD, AND IMAGE PROCESSING PROGRAM

(71) Applicant: ACUTELOGIC CORPORATION, Shinagawa-ku, Tokyo (JP)

(72) Inventor: Isao Yamada, Tokyo (JP)

(73) Assignee: ACUTELOGIC CORPORATION, Tokyo (JP)

( * ) Notice: Subject to any disclaimer, the term of this patent is extended or adjusted under 35 U.S.C. 154(b) by 0 days.

(21) Appl. No.: 14/901,174

(22) PCT Filed: Jun. 19, 2014

(86) PCT No.: PCT/JP2014/066233
§ 371 (c)(1),
(2) Date: Dec. 28, 2015

(87) PCT Pub. No.: WO2014/208434
PCT Pub. Date: Dec. 31, 2014

(65) Prior Publication Data
US 2016/0140696 A1    May 19, 2016

(30) Foreign Application Priority Data

Jun. 25, 2013  (JP) .................. 2013-132987

(51) Int. Cl.
*G06K 9/00*  (2006.01)
*G06T 5/00*  (2006.01)
(Continued)

(52) U.S. Cl.
CPC .............. *G06T 5/002* (2013.01); *G06T 5/10* (2013.01); *G06T 5/20* (2013.01); *H04N 9/04* (2013.01);
(Continued)

(58) Field of Classification Search
CPC .............. G06T 5/20; G06T 5/002; G06T 5/10; G06T 2207/10024; G06T 2207/20182; G06T 2207/20221; G06T 2207/20064; H04N 9/07; H04N 9/646; H04N 9/045; H04N 2209/046; H04N 9/04
(Continued)

(56) References Cited

U.S. PATENT DOCUMENTS 8,009,935 B2 * 8/2011 Sakamoto ............ G06T 3/4015
382/300
2008/0199100 A1   8/2008 Ishiga
(Continued)

FOREIGN PATENT DOCUMENTS

JP   2008-242696 A   10/2008
JP   2011-130112 A   6/2011
(Continued)

OTHER PUBLICATIONS

Japanese office action issued on Sep. 2, 2014 in the counterpart Japanese office action.

*Primary Examiner* — Yon Couso
(74) *Attorney, Agent, or Firm* — Mots Law, PLLC

(57) ABSTRACT

Image processing is performed in view of the difference between the chroma component and the brightness component in an image, with a relatively smaller amount of data processed during the image processing. A frequency decomposing unit 110 performs frequency decomposition directly on Bayer image signals from an imaging element 3. With this, a high frequency component representing color information and a low frequency component representing brightness information are obtained. A filter coefficient obtaining unit 131 of a correction processing unit 130 obtains filter coefficients and the filter coefficients for the high frequency component are different from those for the low frequency
(Continued)

component. A filtering processing unit performs a filtering process on subimages based on the filter coefficients obtained by the filter coefficient obtaining unit 131 in such a manner that processing details of the filtering process for the high frequency component are different from those for the low frequency component.

11 Claims, 13 Drawing Sheets

(51) Int. Cl.
    *G06T 5/20*     (2006.01)
    *H04N 9/04*     (2006.01)
    *G06T 5/10*     (2006.01)
    *H04N 9/64*     (2006.01)
    *H04N 9/07*     (2006.01)

(52) U.S. Cl.
    CPC .............. *H04N 9/045* (2013.01); *H04N 9/646* (2013.01); *G06T 2207/10024* (2013.01); *G06T 2207/20064* (2013.01); *G06T 2207/20182* (2013.01); *G06T 2207/20221* (2013.01); *H04N 9/07* (2013.01); *H04N 2209/046* (2013.01)

(58) Field of Classification Search
    USPC .......................................................... 382/167
    See application file for complete search history.

(56) References Cited

U.S. PATENT DOCUMENTS

| | | | | |
|---|---|---|---|---|
| 2009/0136127 | A1* | 5/2009 | Kwak | .................... H04N 9/646 382/167 |
| 2009/0324117 | A1* | 12/2009 | Demandolx | ............. G06K 9/40 382/254 |
| 2013/0063623 | A1 | 3/2013 | Kawaguchi et al. | |

FOREIGN PATENT DOCUMENTS

| | | |
|---|---|---|
| JP | 2011-239231 A | 11/2011 |
| JP | 2013-088680 A | 5/2013 |
| WO | 2006/106919 A1 | 10/2006 |

\* cited by examiner

FIG.2

|Gr|R|Gr|R|Gr|R|Gr|R|
|---|---|---|---|---|---|---|---|
|B|Gb|B|Gb|B|Gb|B|Gb|
|Gr|R|Gr|R|Gr|R|Gr|R|
|B|Gb|B|Gb|B|Gb|B|Gb|
|Gr|R|Gr|R|Gr|R|Gr|R|
|B|Gb|B|Gb|B|Gb|B|Gb|
|Gr|R|Gr|R|Gr|R|Gr|R|
|B|Gb|B|Gb|B|Gb|B|Gb|

→ HORIZONTAL DIRECTION

↓ VERTICAL DIRECTION

LL

HL

LH

HH

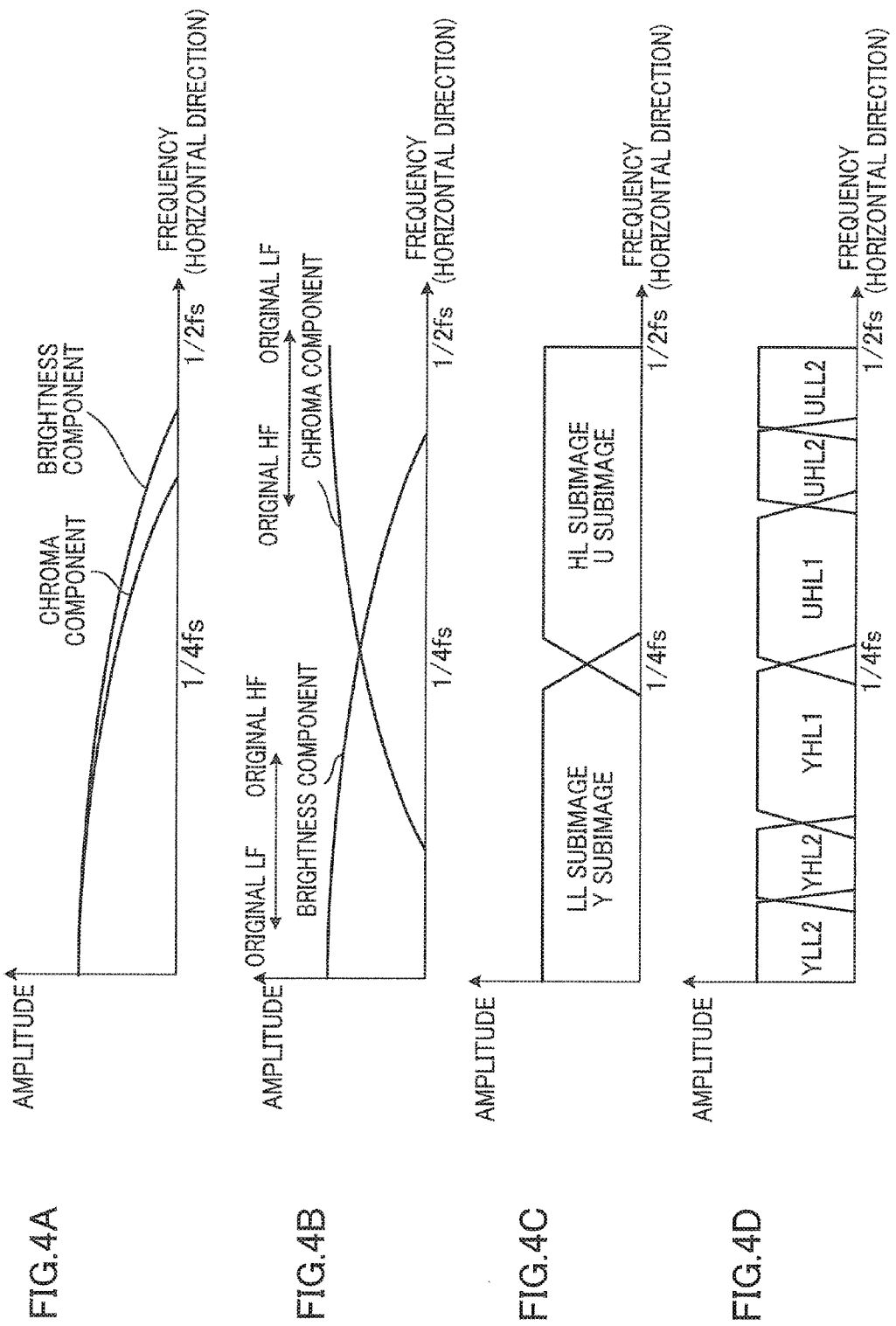

FIG.6
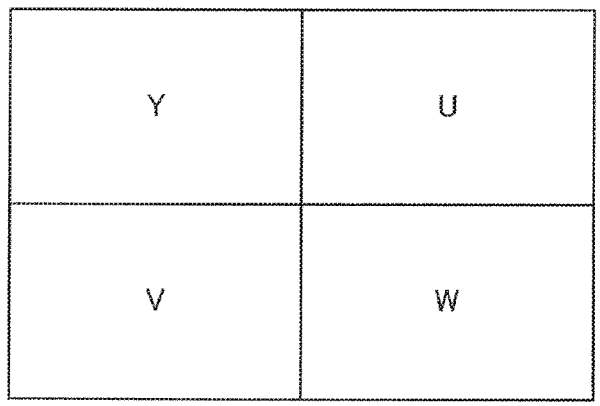

| 1 | 2 | 1 |
|---|---|---|
| 2 | 4 | 2 |
| 1 | 2 | 1 |

| 1 | 1 | 1 |
|---|---|---|
| 1 | 1 | 1 |
| 1 | 1 | 1 |

| 1 | 4  | 6  | 4  | 1 |
|---|----|----|----|---|
| 4 | 16 | 24 | 16 | 4 |
| 6 | 24 | 36 | 24 | 6 |
| 4 | 16 | 24 | 16 | 4 |
| 1 | 4  | 6  | 4  | 1 |

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

/25

IMAGE PROCESSING DEVICE, IMAGE PROCESSING METHOD, AND IMAGE PROCESSING PROGRAM

TECHNICAL FIELD

The present invention relates to: an image processing device, particularly to an image processing device configured to perform image processing on a Bayer image; an image processing method; and an image processing program.

BACKGROUND ART

There has been an image processing device configured to perform objective image processing after various types of processing has been performed on an image constituted by R (red) pixels, G (green) pixels, and B (blue) pixels. For example, in Patent Literature 1, an interpolation process is performed first on a Bayer image constituted by R, G, and B pixels, to form an RGB image in which each pixel has all the R, G, and B components. Then, a brightness (luma) component and color-difference components are generated from the RGB image. Thereafter, different types of image processing are performed on the respective components. The reason why the processing details of the image processing are different depending on the type of the component (the brightness component or the chroma component) is, for example, there is a difference in noise characteristics between the components, and thus it is preferable to change the processing details of the image processing depending on the type of the component in order to suitably remove noise.

In Patent Literature 1, a wavelet transform is performed on each of the brightness component and the chroma components, to generate components having frequency bands different from one another. Then a noise removing process is performed on each of the thus generated components. With this, noise is suitably removed taking into consideration the difference in the noise characteristics between the low frequency component and the high frequency component.

CITATION LIST

Patent Literature

Patent Literature 1: International Publication No. WO 2006/106919

SUMMARY OF INVENTION

Technical Problem

In such a known art as is described in Patent Literature 1, in order to perform image processing focusing on the difference in characteristics between the chroma component and the brightness component of an image, there is no other choice but to make interpolation of pixel components. In this case, the amount of data processed in the image processing is larger than that of the original Bayer image. With such an increase in the amount of data processed, a memory for storing data needs a larger capacity, and/or the processing takes more time.

An object of the present invention is to provide an image processing device, an image processing method, and an image processing program, each configured to perform image processing in view of the difference between the chroma component and the brightness component in an image, with a relatively smaller amount of data processed during the image processing.

Solution to Problem

An image processing device according to the first aspect of the present invention includes: an image obtaining means for obtaining a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction; a first frequency decomposing means for decomposing the Bayer image, with respect to each of the vertical direction and the horizontal direction, into a low frequency component representing brightness information and a high frequency component representing color information, thereby to generate a plurality of subimages; an image processing means for performing at least one of the following processes for image processing of (i) a characteristic amount computation process of computing the amount of characteristic of the Bayer image based on the subimages obtained through frequency decomposition by the first frequency decomposing means, (ii) a correcting process on one or more of the subimages obtained through the frequency decomposition, and (iii) a set of information compression and information decompression processes on one or more of the subimages obtained through the frequency decomposition, in such a manner that processing details of the at least one of the processes for the high frequency component are different from those for the low frequency component; and a first decomposed image combining means for combining the subimages having been processed by the image processing means, to regenerate a single Bayer image.

An image processing method of the first aspect includes: an image obtaining step of obtaining a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction; a frequency decomposing step of decomposing the Bayer image, with respect to each of the vertical direction and the horizontal direction, into a low frequency component representing brightness information and a high frequency component representing color information, thereby to generate a plurality of subimages; an image processing step of performing at least one of the following processes for image processing of (i) a characteristic amount computation process of computing the amount of characteristic of the Bayer image based on the subimages obtained through frequency decomposition in the frequency decomposing step, (ii) a correcting process on one or more of the subimages obtained through the frequency decomposition, and (iii) a set of information compression and information decompression processes on one or more of the subimages obtained through the frequency decomposition, in such a manner that processing details of the at least one of the processes for the high frequency component are different from those for the low frequency component; and a decomposed image combining step of combining the subimages having been processed in the image processing step, to regenerate a single Bayer image.

A program of the first aspect is a program for causing a computer to execute the following steps of: an image obtaining step of obtaining a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction; a frequency decomposing step of decomposing the Bayer image, with respect to each of the vertical direction and the horizontal direction, into a low frequency component representing brightness information and a high frequency component representing color information, thereby to generate a plurality of subimages; an image processing step of performing at least one of the following processes for image processing of (i) a characteristic amount computation process of computing the amount of characteristic of the Bayer image based on the subimages obtained through frequency decomposition in the frequency decomposing step, (ii) a correcting process on one or more of the subimages obtained through the frequency decomposition, and (iii) a set of information compression and information decompression processes on one or more of the subimages obtained through the frequency decomposition, in such a manner that processing details of the at least one of the processes for the high frequency component are different from those for the low frequency component; and a decomposed image combining step of combining the subimages having been processed in the image processing step, to regenerate a single Bayer image.

The program of the present invention is distributable through magnetic recording media such as a flexible disk, optical recording media such as a DVD-ROM, computer-readable recording devices such as a hard disk and a USB flash drive on which the program is recordable, or through downloading via the Internet.

An image processing device according to the second aspect of the present invention includes: an image obtaining means for obtaining a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction; a frequency decomposing means for decomposing the Bayer image, with respect to each of the vertical direction and the horizontal direction, into a low frequency component representing brightness information and a high frequency component representing color information, thereby to generate a plurality of subimages; an image processing means for performing at least one of the following processes for image processing of (i) a characteristic amount computation process of computing the amount of characteristic of the Bayer image based on the subimages obtained through frequency decomposition by the frequency decomposing means, (ii) a correcting process on one or more of the subimages obtained through the frequency decomposition, and (iii) an information compression process on one or more of the subimages obtained through the frequency decomposition, in such a manner that processing details of the at least one of the processes for the high frequency component are different from those for the low frequency component; and an output means for outputting at least one of (i) the subimages on which the at least one of the processes for image processing has been performed by the image processing means and (ii) the amount of characteristic.

Advantageous Effects of Invention

The present invention is based on the finding that, out of subbands obtained by performing frequency decomposition on a Bayer image, the subbands of the low frequency component represents brightness information, and the subbands of the high frequency component represent color information. In the present invention, based on the above finding, a Bayer image is decomposed into the low frequency component representing brightness information and the high frequency component representing color information through the frequency decomposition, and then image processing is performed on the components so that the processing details of the image processing are different between the components. Thus, image processing is performed so that its processing details changes depending on whether the to-be-processed component is the chroma component or the brightness component in the image. With this, image processing is suitably performed depending on the type of the component. Further, the components are obtained by performing frequency decomposition directly on a Bayer image. Therefore, as compared to the case where frequency decomposition is performed after interpolation, the amount of data processed in the image processing is smaller. The image processing device according to the first aspect regenerates the original image by combining the subimages after performing the image processing.

As described above, the frequency decomposition by the first frequency decomposing means in the first aspect is based on the finding that the image data is decomposed into the chroma component and the brightness component by performing the frequency decomposition directly on a Bayer image. In known frequency decomposition techniques, frequency decomposition is performed after interpolation of the pixels of the Bayer image is performed; and image processing is performed merely focusing on the difference in frequency of the components, i.e., the low frequency component or the high frequency component. Thus, the known frequency decomposition techniques are different from the frequency decomposition in the present invention.

According to the second aspect, image processing is suitably performed depending on the type of the component, similarly to the first aspect. Further, the components are obtained by performing frequency decomposition directly on a Bayer image. Therefore, as compared to the case where frequency decomposition is performed after interpolation, the amount of data processed in the image processing is smaller. The image processing device according to the second aspect outputs the subimages without combining the subimages after performing the image processing, and/or outputs the amount of characteristic computed.

BRIEF DESCRIPTION OF DRAWINGS

FIG. 2 is a schematic diagram illustrating the Bayer array of color filters of an imaging element of FIG. 1.

FIG. 4A is a graph schematically illustrating frequency distribution of a chroma component and a brightness component in a subject image before sampled in the imaging element. FIG. 4B is a graph schematically illustrating frequency distribution of the chroma component and the brightness component in the subject image after sampled in the imaging element. FIG. 4C is a graph schematically illustrating frequency distribution of subimages generated through a 1-level discrete wavelet transform. FIG. 4D is a graph schematically illustrating frequency distribution of subimages generated by further performing a 2-level discrete wavelet transform on the subimages in FIG. 4C.

FIG. 6 is a schematic diagram illustrating a relationship between the subimages generated through the 1-level discrete wavelet transform and the subimages generated through the 2-level discrete wavelet transform performed after the 1-level discrete wavelet transform.

FIG. 7A to FIG. 7D are schematic diagrams illustrating filter coefficients used in a correcting process in the first embodiment.

DESCRIPTION OF EMBODIMENTS

First Embodiment

Figure 1:
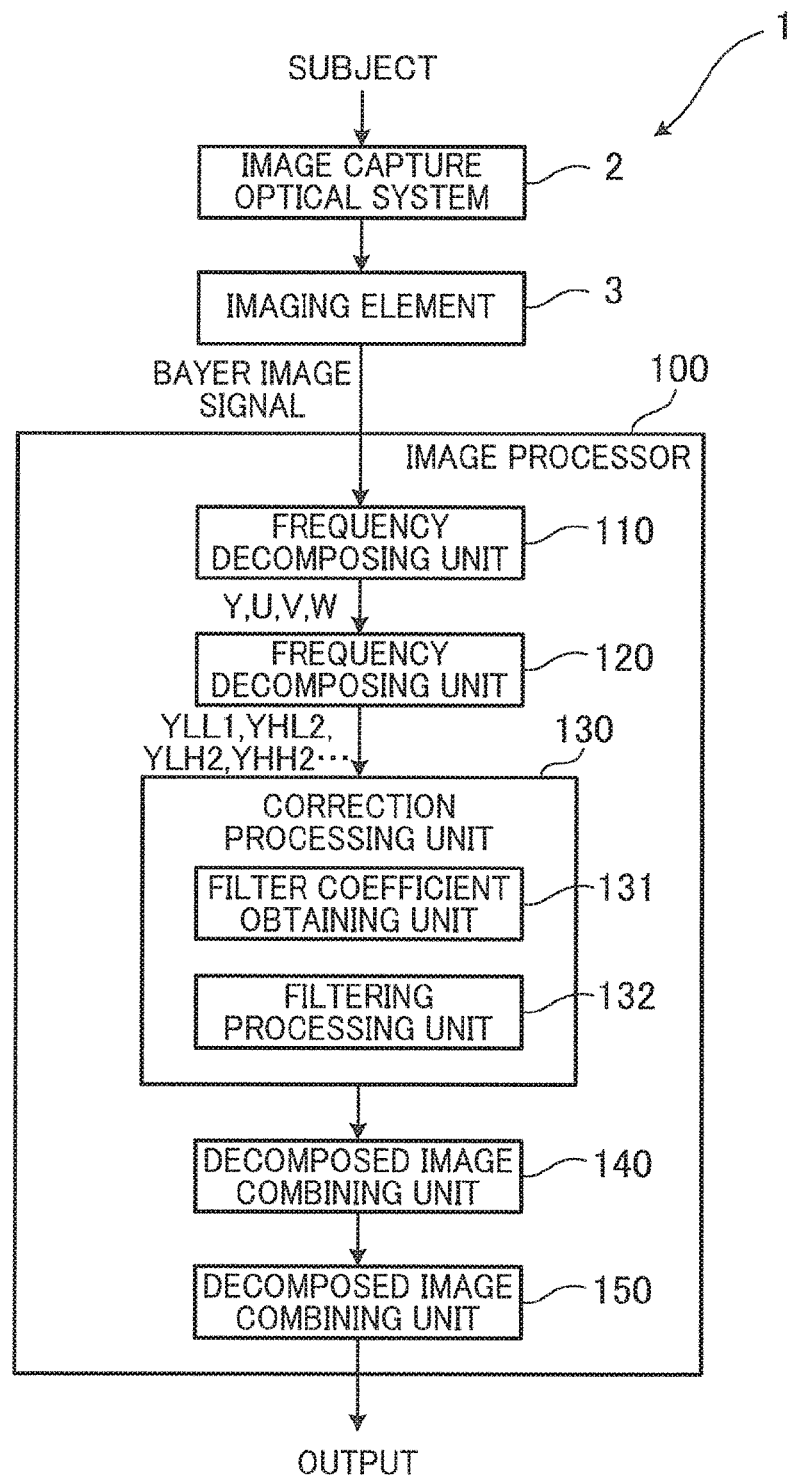
FIG. 1 is a block diagram of an imaging device of the first embodiment, which is an embodiment of the present invention.

The following will describe an imaging device 1 of the first embodiment, which is an embodiment of the present invention, with reference to the drawings. As shown in FIG. 1, the imaging device 1 includes: an image capture optical system 2, an imaging element 3 (image obtaining means), and an image processor 100 (image processing means). The image capture optical system 2 includes a variety of lenses. The image capture optical system 2 is configured to introduce light from a subject to the imaging element 3 so that an image is formed on the imaging element 3. The imaging element 3 is configured to convert the image of the subject formed thereon into electrical signals by means of photoelectric conversion, and then convert the electrical signals into the digital image signals to output the digital image signals. The image processor 100 is configured to perform predetermined signal processing on the digital image signals output from the imaging element 3, to generate image data corresponding to the subject image. The image data generated by the image processor 100 is output onto a display for displaying an image in the form of image signals for an image to be displayed, or is output to a computer-readable recording medium. Hereinafter, the imaging element 3 and the image processor 100 will be detailed.

The imaging element 3 includes: Bayer-arrayed color filters; photoelectric conversion elements configured to output analog signals corresponding to the intensity of light received through the respective color filters; and an AD converter configured to convert the analog signals from the photoelectric conversion elements to digital signals. As shown in FIG. 2, the Bayer array is constituted by: first rows in each of which R (red) and G (green) elements are alternately arranged in a horizontal direction; and second rows in each of which G (green) and B (blue) elements are alternately arranged in the horizontal direction, and the first and second rows are alternatively arranged in a vertical direction. In FIG. 2, G elements pertaining to each row including R elements are denoted by Gr, while G elements pertaining to each row including B elements are denoted by Gb. The imaging element 3 outputs image signals indicating an image in which pixels are arranged in accordance with the Bayer array. Hereinafter, such an image is referred to as a "Bayer image".

The image processor 100 includes two frequency decomposing units configured to decompose the image signals from the imaging element 3 into high and low frequency components. Each of the frequency decomposing units 110 and 120 (first and second frequency decomposing means) is configured to decompose the image signals in accordance with a discrete wavelet transform.

There are a variety of filters which can be used for the discrete wavelet transform. In this embodiment, CDF 5/3 wavelet is used. In this method, low frequency components are generated through a 5-tap low-pass filter (5 pixels in one dimension), and high frequency components are generated through a 3-tap high-pass filter (3 pixels in one dimension). Note that CDF 9/7 wavelet or the like may be used. Any type of wavelet may be used as long as it is a reversible multiresolution transform, such as Haar Wavelet. In one dimension, the filter coefficients in the CDF 5/3 wavelet are as follows.

Low-pass filter: $[-1/8, 2/8, 6/8, -1/8]$
High-pass filter: $[-1/2, 1, -1/2]$

Figure 3A:
FIG. 3A to FIG. 3D each is a schematic diagram illustrating the relationship between filter coefficients adopted in a discrete wavelet transform used in the first embodiment and pixels in the Bayer array.

These are developed in two dimensions into filters shown in FIG. 3A to FIG. 3D. The filter of FIG. 3A functions as a low-pass filter with respect to both of the horizontal direction and the vertical direction of an image. In FIG. 3A, each of numerical values arranged in a matrix in the horizontal direction and in the vertical direction represents the weight for the pixel position corresponding to the numerical value, with respect to the horizontal direction and the vertical direction. Further, "/64" means that the quotient of the weight for each pixel position divided by 64 is the filter coefficient for that pixel position. The same is applied to FIG. 3B to FIG. 3D. Hereinafter, the filter of FIG. 3A is referred to as "LL filter".

Figure 3B:
Figure 3C:
Figure 3D:

The filter of FIG. 3B functions as a high-pass filter with respect to the horizontal direction of an image, while functions as a low-pass filter with respect to the vertical direction of the image. Hereinafter, the filter of FIG. 3B is referred to as "HL filter". The filter of FIG. 3C functions as a low-pass filter with respect to the horizontal direction of an image, while functions as a high-pass filter with respect to the vertical direction of the image. Hereinafter, the filter of FIG. 3C is referred to as "LH filter". The filter of FIG. 3D functions as a high-pass filter with respect to both of the horizontal direction and the vertical direction of an image. Hereinafter, the filter of FIG. 3D is referred to as "HH filter".

When an image is filtered with any of these filters, each pixel is multiplied by the filter coefficient included in the filter and corresponding to the position of the pixel, and the sum of all the results of such multiplications is regarded as a pixel value after filtering process. FIG. 3A to FIG. 3D each shows an example in which a Bayer image is filtered in this manner. In each of these figures, each pixel included in the Bayer image is multiplied by the filter coefficient corresponding to the position of the pixel. The above filtering computation is performed for each of LL, HL, LH, and HH filters. The filtering computation is performed on each block of two pixels in the horizontal direction by two pixels in the vertical direction of an image. As the results of the filtering process using these filters, there are obtained four types of subimages each having a pixel value after filtering process. Hereinafter, the subimage obtained through the filtering process using the LL filter is referred to as LL subimage. Similarly, the subimages respectively obtained through the filtering processes using the HL, LH, and HH filters are respectively referred to as HL, LH, and HH subimages.

The LL subimage is the subimage corresponding to the low frequency component of an original image with respect to both of the horizontal direction and the vertical direction. The HL subimage is the image corresponding to the high frequency component of the original image with respect to the horizontal direction, while corresponding to the low frequency component of the original image with respect to the vertical direction. The LH subimage is the image corresponding to the low frequency component of the original image with respect to the horizontal direction, while corresponding to the high frequency component of the original image with respect to the vertical direction. The HH subimage is the subimage corresponding to the high frequency component of the original image with respect to both of the horizontal direction and the vertical direction.

If the imaging element is a monochromatic imaging element, instead of the imaging element where multicolor color filters are arrayed, the result of the frequency decomposition of image signals obtained from the monochromatic imaging element is merely the result of the frequency decomposition of the brightness component of an image. However, when the above-described frequency decomposition is performed on a Bayer image obtained from the imaging element 3 of this embodiment, where multicolor color filters are arrayed, subimages obtained by the frequency decomposition show characteristics different from those of the mere result of the frequency decomposition of the brightness component. This will be described below.

First, for the sake of convenience, only the horizontal direction of an image is dealt with. A subject image is a composition of a brightness component and a chroma component. FIG. 4A shows an example of frequency distribution of the brightness component and the chroma component in a subject image before entering into the imaging element 3. FIG. 4B shows an example of frequency distribution of the brightness component and the chroma component in image signals after sampling in the imaging element 3. Note that fs represents a sampling frequency. As shown in the figures, the brightness component and the chroma component of the subject image before entering into the imaging element 3 are quadrature-modulated by the Bayer-arrayed color filters in the imaging element 3. In this way, the brightness component is positioned on the lower frequency side, while the chroma component is positioned on the higher frequency side.

The frequency decomposition of this embodiment is first performed on the image, in which the brightness component and the chroma component are positioned as shown in FIG. 4B. For example, through the filtering process using the LL and HL filters, the Bayer image shown in FIG. 4B is decomposed into the high frequency component and the low frequency component with respect to the horizontal direction, as shown in FIG. 4C. Therefore, LL subimage includes a lot of brightness component, while HL subimage includes a lot of chroma component. Thus, performing the frequency decomposition on a Bayer image corresponds to demodulation of the brightness component and the chroma component which have been quadrature-modulated by the Bayer-arrayed color filters.

Figure 5A:
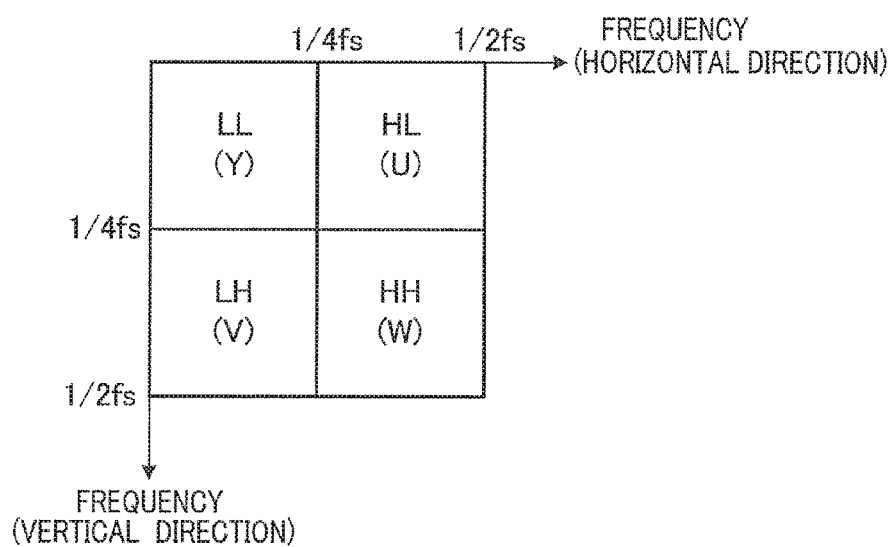
FIG. 5A is a graph schematically illustrating frequency distribution of each subimage with respect to a horizontal direction and a vertical direction.
Figure 5B:
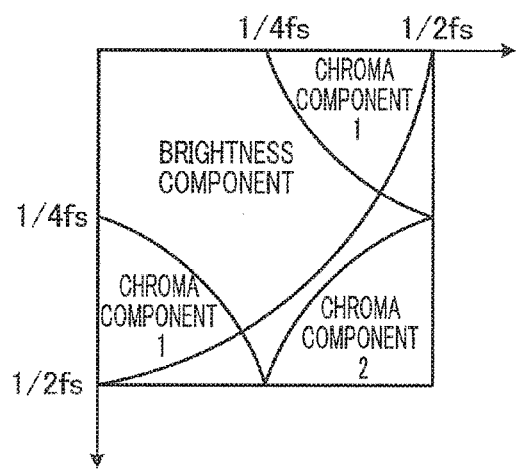
FIG. 5B is a graph schematically illustrating frequency distribution of the chroma component and the brightness component included in the subimages.

Now, the above discussion will be developed in two dimensions. FIG. 5A illustrates frequency distribution of each of the LL, HL, LH, and HH subimages, with respect to the horizontal direction and the vertical direction. FIG. 5B illustrates the distributions of the brightness component and the chroma component in each of the LL, HL, LH, and HH subimages, with respect to the frequency in the horizontal direction and the frequency in the vertical direction, similarly to FIG. 5A. As can be seen from comparison between FIG. 5A and FIG. 5B, the LL subimage mainly includes the brightness component, while each of the HL, LH, and HH subimages mainly includes the chroma component. That is to say, the LL subimage represents brightness information in the original image, while each of the HL, LH, and HH subimages represents color information in the original image.

The frequency decomposing unit 110 of this embodiment performs a one-level discrete wavelet transform on image signals of a Bayer image output from the imaging element 3, by using the filter coefficients shown in FIG. 3A to FIG. 3D. In other words, the frequency decomposing unit 110 generates four subimages, which are LL, HL, LH, and HH subimages, from the image signals of the Bayer image. Hereinafter, the four subimages generated by the frequency decomposing unit 110 are referred to as Y (=LL), U (=HL), V (=LH), and W (=HH) subimages.

As a result of the filtering process using the filter coefficients shown in FIG. 3A to FIG. 3D, pixels in each of the Y, U, V, and W subimages introduce elements of R, B, and G pixels in the original image, in accordance with the formulae presented below. The Y subimage mainly represents the brightness component of the image. If the subject includes a lot of high-frequency chroma component, the brightness component and the high-frequency chroma component coexist with each other in the Y subimage. The U subimage mainly represents the chroma component of the image. If the subject includes a lot of high-frequency brightness component with respect to the horizontal direction, the chroma component and the high-frequency brightness component coexist with each other in the U subimage. The V subimage mainly represents the chroma component of the image. When the subject includes a lot of high-frequency brightness component with respect to the vertical direction, the chroma component and the high-frequency brightness component coexist with each other in the V subimage. The W subimage mainly represents the chroma component of the image. When the subject includes a lot of high-frequency chroma components, the chroma component and the high-frequency chroma component coexist with each other in the W subimage.

$Y=(2G+R+B)/4$ $U=(R-B)/2$ $V=(B-R)/2$ $W=2G-(R+B)$

Then, the frequency decomposing unit 120 performs a two level of the discrete wavelet transform on each of the Y, U, V, and W subimages generated by the frequency decomposing unit 110. Specifically, as shown in FIG. 6, the frequency decomposing unit 120 decomposes each of the Y, U, V, and W subimages into LL, HL, LH, and HH subimages, and further decompose each of the thus generated LL subimages into LL, HL, LH, and HH subimages. In the following description, the subimages generated through the first-level decomposition by the frequency decomposing unit 120 are denoted by YHL1, YLH1, YHH1, and the like. Further, the subimages generated thorough the second-level decomposition by the frequency decomposing unit 120 are denoted by YLL2, YHL2, YLH2, YHH2, and the like. In these denotations, the first letter Y, U, V, or W means which of the Y, U, V, and W subimages is the origin.

As for the subimages generated by the frequency decomposing unit 120, such as YLL2, YHL2, YHL1, UHL1, UHL2, and ULL2, the degree of separation of the brightness component and the chroma component is improved as compared with the Y, U, V, and W subimages generated by the frequency decomposing unit 110. FIG. 4D shows frequency distribution of each subimage generated by the frequency decomposing unit 120, with respect to the horizontal direction. The Y and U subimages shown in abovementioned FIG. 4C mainly include the brightness component and the chroma component, respectively. As can be seen from comparison with FIG. 4B, each of the Y and U subimages possibly includes the high frequency component in the subject image together with its main component. To the contrary, as seen from FIG. 4D, the ULL2 subimage does not include the high-frequency brightness component, and represents the low-frequency chroma component in the original subject image only. Further, the YLL2 subimage does not include the high-frequency chroma component, and represents the low-frequency brightness component in the original subject image only.

As shown in FIG. 1, the image processor 100 includes a correction processing unit 130 configured to perform a correcting process on each of the subimages generated by the frequency decomposing unit 120. In the correcting process by the correction processing unit 130, each subimage is filtered, to reduce noise components. In this embodiment, a bilateral filter is used as an edge preserving filter.

First, the bilateral filter will be described. A set of pixels Ω included in a square area in a 2N+1 by 2N+1 matrix of pixels (N: natural number) having the current pixel at its center is expressed as follows. For example, when the size of the filter kernel is a 3 by 3 matrix, N=1. When the size of the filter kernel is a 5 by 5 matrix, N=2.

$\Omega=\Omega p(N)$

Computation of the bilateral filter is carried out through calculation of weighted average of q∈Ω, all the pixels belonging to Ω. The weight allocated to each pixel is determined by two terms: a weight depending on the distance; and a weight depending on the difference in pixel value from the current pixel. Now, the current pixel is denoted by p, and each pixel belonging to Ω is denoted by q. Assuming that Δ(p,q) is the distance between the pixels p and q, the weight depending on the distance is expressed as follows.

$$w_s(p, q) = e^{-\frac{\Delta^2(p,q)}{\sigma_s^2}}$$ [Equation 3]

Assuming that Df (p,q) is the difference in pixel value between the pixels p and q, the weight depending on the difference in pixel value from the current pixel is expressed as follows.

$$w_R(p, q) = e^{-\frac{D_f^2(p,q)}{\sigma_R^2}}$$ [Equation 4]

Then, the weight for each pixel is the product of the weight depending on the distance and the weight depending on the difference in pixel value, and expressed as follows.

$w(p,q)=w_s(p,q) \times w_R(p,q)$ [Equation 5]

Assuming that the pixel value of the pixel p is $u_p$, and that the pixel value of the pixel q is $u_q$, the computation of the bilateral filter is performed as follows. Note that u' is the pixel value after filtering process.

$$u'_p = \frac{\sum_{q \in \Omega} w(p, q) u_q}{\sum_{q \in \Omega} w(p, q)}$$ [Equation 6]

The correction processing unit 130 of this embodiment includes: a filter coefficient obtaining unit 131 (filter obtaining means) configured to obtain filter coefficients for the filtering process by the bilateral filter; and a filtering processing unit 132 (filtering processing means) configured to perform the filtering process based on the filter coefficients obtained by the filter coefficient obtaining unit 131. The filter coefficient obtaining unit 131 obtains the filter coefficients as follows.

In this embodiment, a main object of the filtering is to reduce noise in the low frequency component such as YLL2. Therefore, the reference range of the filter (the size of the filter kernel) may be set to on the order of 3 by 3 to 5 by 5. The YLL2 subimage and the like have been downsampled through the frequency decomposition. Therefore, filtering of the low-frequency component is possible even though the kernel size is smaller.

With respect to the weight $w_s$ depending on the distance, the filter coefficient obtaining unit 131 has weights $w_{s1}$ and $w_{s2}$ respectively shown in FIG. 7A and FIG. 7B, each in a matrix of 3 by 3, or has weights $w_{s1}$ and $w_{s2}$ respectively shown in FIG. 7C and FIG. 7D, each in a matrix of 5 by 5. Similarly to FIG. 3A to FIG. 3D, FIG. 7A to FIG. 7D each illustrates filter coefficients corresponding to respective pixel positions. As shown, the weights in $w_{s1}$ and $w_{s2}$ are integer numbers. This reduces the amount of computation. Note that a group of filter coefficients obtained based on the weight $w_{s1}$ corresponds to a first coefficient group in the present invention. Further, a group of filter coefficients obtained based on the weight $w_{s2}$ corresponds to a second coefficient group in the present invention.

The value of the weight $w_{s1}$ (first weight) decreases with the increase of the distance between the pixels (monotonously decreasing with respect to the distance). The weight $w_{s1}$ is used for the filtering process on the YLL2 subimage and the like representing brightness information. Meanwhile, for the ULL2, VLL2, and WLL2 subimages representing color information, the weight $w_{s2}$ (second weight) is used. The value of the weight $w_{s2}$ is always 1 regardless of the pixel position. Thus, the weight $w_{s2}$ does not depend on the distance. If the weight of which value does not changes depending on the distance between pixels, or the weight of which decrease rate in value depending on the distance between pixels is relatively small is used, the performance of the filter in noise reduction increases, while the resolution of the filtering-processed image decreases. However, human visual perception is less sensitive to a change in the resolution of a color (e.g., blurring of a color) than a change in the resolution of the brightness. Thus, by using the weight $w_{s2}$ for the ULL2, VLL2, and WLL2 subimages representing color information, color noise is reduced while the deterioration of the image is relatively less likely to be recognized due to the characteristic of human visual perception, though there is a little blurring in the chroma component.

For the weight $w_R$ depending on the difference between pixel values, the filter coefficient obtaining unit 131 has values of $\sigma^2_R$. The values of $\sigma_R$ are set in advance, for example, in accordance with the characteristics of the image capture optical system 2 and the imaging element 3 of the imaging device 1. The setting values are obtained in the following manner. By the image capture optical system 2 and the imaging element 3, generated are Bayer image signals for a subject having a uniform brightness. Then, on the Bayer image signals, the above-described frequency decomposition is performed by the frequency decomposing units 110 and 120. With this, the subimages such as YLL1, YHL2, YLH2, YHH2, and ULL1 are obtained. Then, for each of the subimages, the standard deviation $\sigma_N$ of the pixel values is calculated. Thereafter, $\sigma_N$ is multiplied by an appropriate coefficient $k_N$, to obtain $\sigma_R$, which is expressed as follows.

$$\sigma_R = \sigma_N \times k_N \qquad \text{[Equation 7]}$$

It should be noted that the magnitude of $k_N$ is adjusted taking into consideration the balance between the deterioration in the image after processing and the noise reduction ability. For example, the smaller $k_N$ is, the poor the noise reduction ability is, though the lower the degree of deterioration of the image after processing is. To the contrary, the smaller $k_N$ is, the greater the noise reduction ability is, though the lower the degree of deterioration of the image after processing is. The deterioration of the image means deterioration in resolution as for brightness information, and means an increase of blurring of a color as for color information, for example. In this embodiment, $k_N$ is set by the use of the above-described characteristic of human visual perception: human visual perception is less sensitive to the change in the resolution of a color (e.g., blurring of a color) than the change in the resolution of the brightness. For example, $k_N$ is set so that: the value of $k_N$ is smaller for the YHL1 subimage and the like representing the high-frequency brightness component, while the value of $k_N$ is larger for the subimages of ULL2, VLL2, and the like representing the low-frequency chroma component.

As described above, the filter coefficient obtaining unit 131 has the values of $\sigma^2_R$ set in advance for the respective subimages such as YLL2 and YHL1. The values of $\sigma^2_R$ are respectively associated with these subimages. In summary, the filter coefficient obtaining unit 131 has: the weight $w_{s1}$ used for the YLL2 subimage and the like representing brightness information; the weight $w_{s2}$ used for the ULL2 subimage and the like representing color information; and the values of $\sigma^2_R$ for the respective subimages. The filter coefficient obtaining unit 131 calculates a filter coefficient c (p,q) for each subimage, based on Equations 4 to 6, and using $\sigma^2_R$, $w_{s1}$, and $w_{s2}$. The filter coefficient c (p,q) is used in the filtering computation expressed as above Equation 6.

$$c(p, q) = \frac{w(p, q)}{\sum_{q \in \Omega} w(p, q)} \qquad \text{[Equation 8]}$$

Then, using the filter coefficient obtained by the filter coefficient obtaining unit 131, the filtering processing unit 132 performs the filtering process on each subimage, in accordance with above Equation 6.

As shown in FIG. 1, the image processor 100 further includes decomposed image combining units 140 and 150 (first and second decomposed image combining means), configured to combine all the subimages on which the correction processing unit 130 has performed the correcting process, to regenerate a Bayer image. The decomposed image combining unit 140 performs the inverse transform to the discrete wavelet transform performed by the frequency decomposing unit 120, on the subimages such as YLL2 and YHL1, to reproduce Y, U, V, and W subimages. Then, the decomposed image combining unit 150 performs the inverse transform to the discrete wavelet transform performed by the frequency decomposing unit 110 on the Y, U, V, and W subimages generated by the decomposed image combining unit 140, to regenerate the Bayer image.

Example

Figure 8:
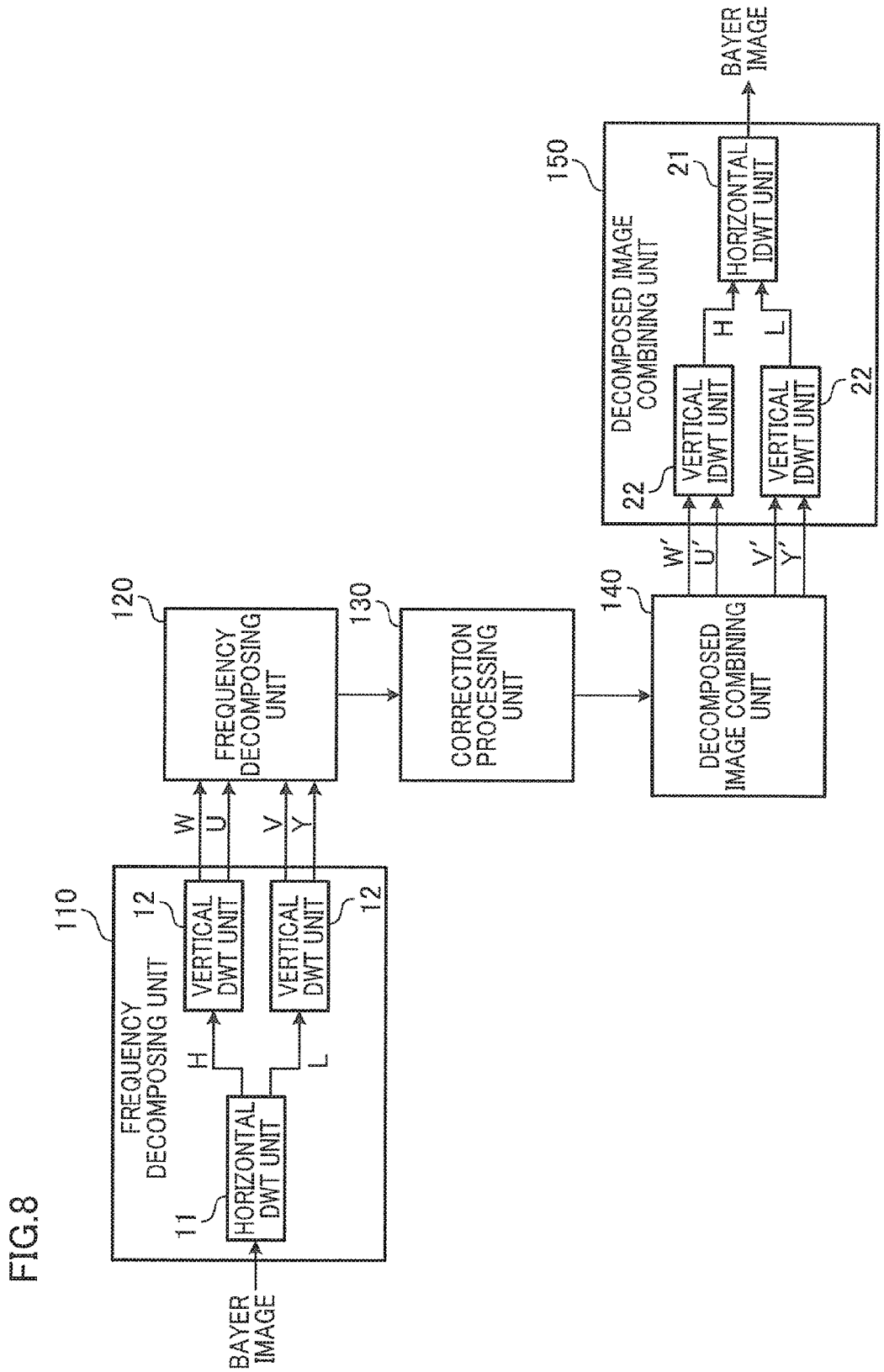
FIG. 8 is a block diagram illustrating a circuit configuration of an Example of an image processor of the first embodiment.
Figure 9:
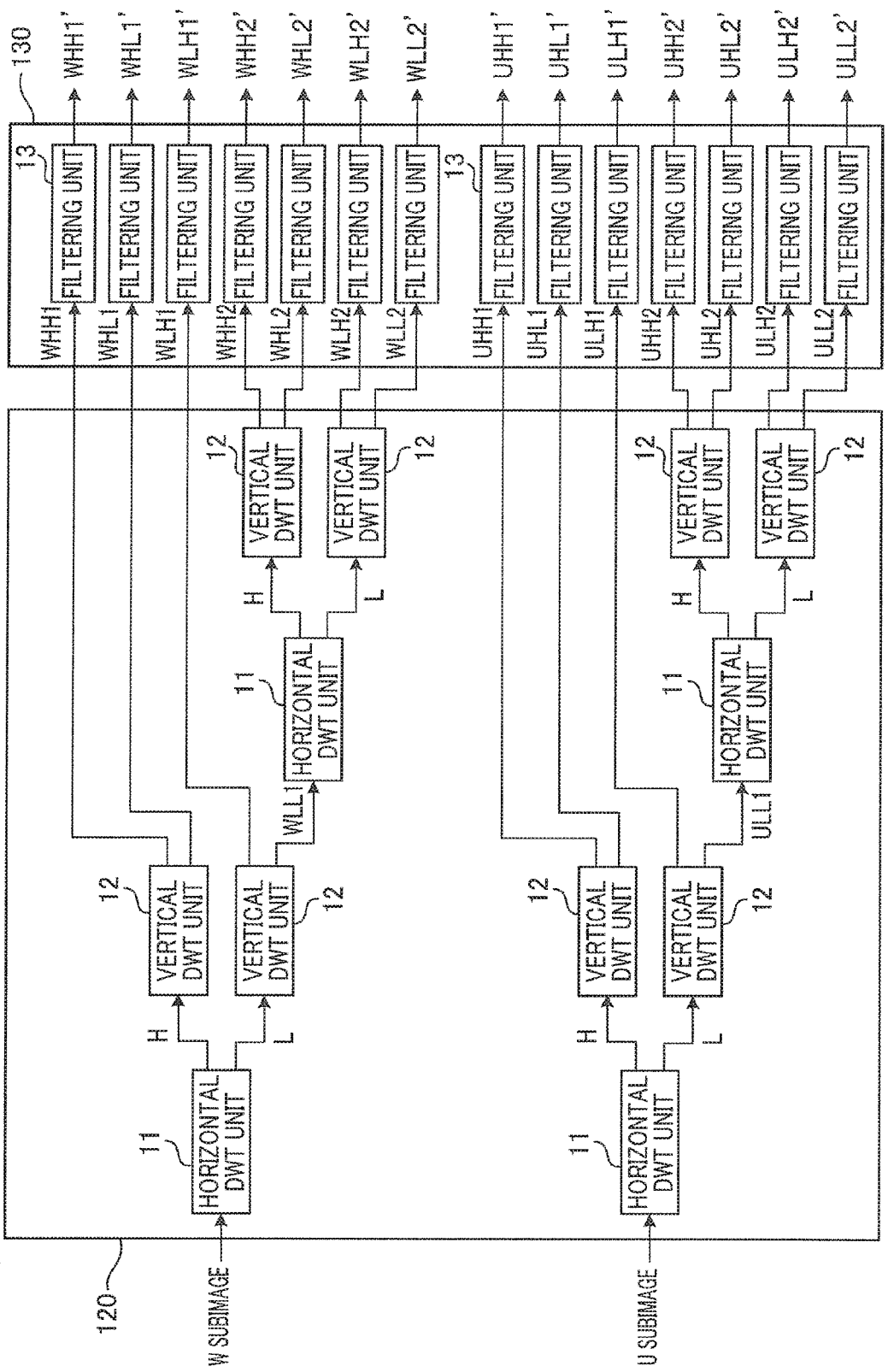
FIG. 9 is a block diagram illustrating: a part of a circuit configuration of a frequency decomposing unit of FIG. 8, which part is for frequency decomposition of images W and U; and a part of a circuit configuration of a correction processing unit, which part is for performing a filtering process on the subimages, such as WHH1 and UHH2, generated as a result of the frequency decomposition.
Figure 10:
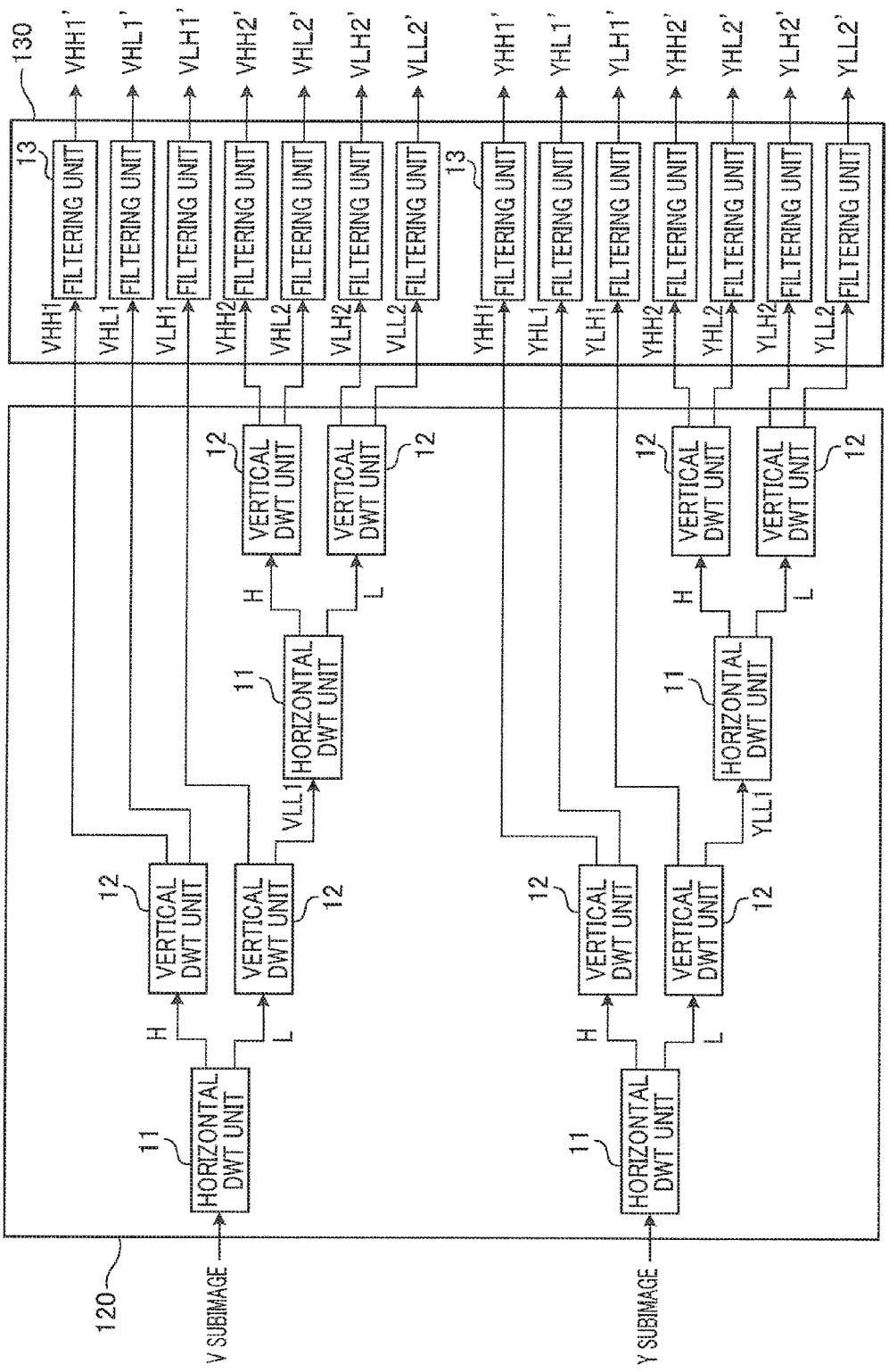
FIG. 10 is a block diagram illustrating: a part of the circuit configuration of the frequency decomposing unit of FIG. 8, which part is for frequency decomposition of images V and Y; and a part of the circuit configuration of the correction processing unit, which part is for performing the filtering process on the subimages, such as VHH1 and YHH2, generated as a result of the frequency decomposition.

The following will describe the circuit configuration of an Example of the frequency decomposing units 110 and 120, and the decomposed image combining units 140 and 150, with reference to FIG. 8 to FIG. 12. In this Example, each of the above units such as the frequency decomposing unit 110 is constructed as a circuit configured to process an image using a line buffer. As shown in FIG. 8 to FIG. 10, the circuit configuring each of the frequency decomposing units 110 and 120 includes: one or more horizontal DWT units 11 each configured to decompose an input image into the high frequency component and the low frequency component with respect to the horizontal direction; and vertical DWT units 12 each configured to decompose the input image into the high frequency component and the low frequency component with respect to the vertical direction. The circuit configuration for each one-level discrete wavelet transform is constituted by one horizontal DWT unit 11 and two vertical DWT units 12. As described above, the frequency decomposing unit 110 performs the one-level discrete wavelet transform. Therefore, as shown in FIG. 8, a single-stage circuit configuration is provided to function as the frequency decomposing unit 110.

The horizontal DWT unit 11 performs the computation corresponding to Equation 9 described below on 0th to (2N+1)th pixels arranged in the horizontal direction in an input image, to extract a high-pass component H(n) (n=0, 1, 2 . . . N). Meanwhile, the horizontal DWT unit 11 performs the computation corresponding to Equation 10 described below on 0th to (2N+1)th pixels arranged in the horizontal direction in the input image, to extract a low-pass component L(n) (n=0, 1, 2 . . . N). It should be noted that in Equations 8 and 9, s (m) represents the pixel value of the mth pixel in the horizontal direction. The vertical DWT unit 12 performs computations respectively corresponding to Equations 9 and 10 on the pixels in the input image arranged in the vertical direction, in the same way as the horizontal DWT unit 11. In the computations by the vertical DWT unit 12, s(m) represents the pixel value of the mth pixel in the vertical direction.

$$H(n) = s(2n+1) - \frac{s(2n+2) + s(2n)}{2} \quad \text{[Equation 9]}$$

$$L(n) = s(2n) + \frac{H(n) + H(n-1)}{4} \quad \text{[Equation 10]}$$

The horizontal DWT unit 11 in the frequency decomposing unit 110 decomposes a Bayer image into H component and L component with respect to the horizontal direction. One of the vertical DWT units 12 decomposes the H component from the horizontal DWT unit 11 into the high frequency component and the low frequency component with respect to the vertical direction. With this, W (HH) subimage and U (HL) subimage are generated. The other of the vertical DWT units 12 decomposes the L component from the horizontal DWT unit 11 into the high frequency component and the low frequency component with respect to the vertical direction. With this, V (LH) subimage and Y (LL) subimage are generated. Note that the discrete wavelet transform performed on the Bayer image based on the above-described Equations 9 and 10 is equivalent to the discrete wavelet transform shown in FIG. 3A to FIG. 3D.

As described above, the frequency decomposing unit 120 performs the two-level discrete wavelet transform on the image. To implement this, in the frequency decomposing unit 120, a two-stage circuit configuration constituted by the single horizontal DWT unit 11 and the two vertical DWT units 12 is provided for each of the Y, U, V, and W subimages, as shown in FIG. 9 and FIG. 10. Reference is made to the W subimage, for example. The horizontal DWT unit 11 at the first stage decomposes the W subimage into H component and L component with respect to the horizontal direction, as shown in FIG. 9. Then, the two vertical DWT units 12 respectively decompose the H component and the L component with respect to the vertical direction, each into the high frequency component and the low frequency component. With this, WHH1, WHL1, WLH1, and WLL1 subimages are generated. Of these, the WHH1, WHL1, and WLH1 subimages are output to the correction processing unit 130, while only the remaining WLL1 subimage is output to the horizontal DWT unit 11 at the second stage. The WLL1 subimage is decomposed, by the horizontal DWT unit 11 and the vertical DWT units 12 at the second stage, into WHH2, WHL2, WLH2, and WLL2 subimages. These subimages are output to the correction processing unit 130. Y, U, and V subimages are decomposed in the same way.

Each subimage is input to a corresponding filtering unit 13 provided to function as the correction processing unit 130. The filtering unit 13 is provided for each of the subimages. Each filtering unit 13 has the function of the filter coefficient obtaining unit 131 and the function of the filtering processing unit 132. The filtering unit 13 has the weight $w_{s1}$ or $w_{s2}$ and $\sigma^2_R$, corresponding to the subimage associated therewith. The filtering unit 13 obtains the filter coefficients based on the type of the subimage input thereto, and performs the filtering process on the subimage. The subimage on which the filtering process (correcting process) has been performed is output to the decomposed image combining unit 140. In FIG. 9 and FIG. 10, each subimage after the correcting process is denoted by WHH1', ULL2', and the like.

Figure 11:
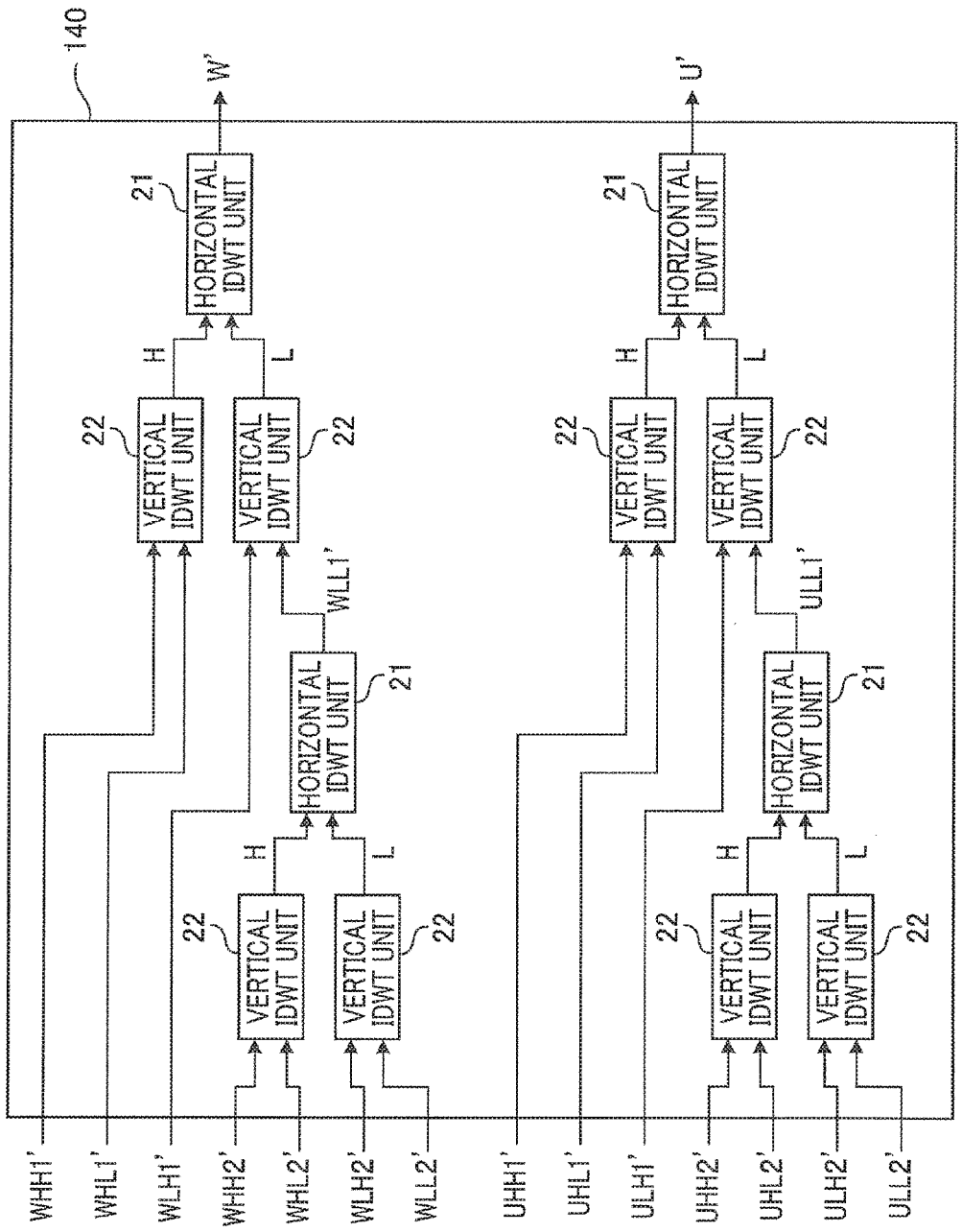
FIG. 11 is a block diagram illustrating a part of a circuit configuration of a decomposed image combining unit in FIG. 8, which part is for combining subimages, such as WHH1' and ULH2', on which the correcting process has been performed, to generate images W' and U'.
Figure 12:
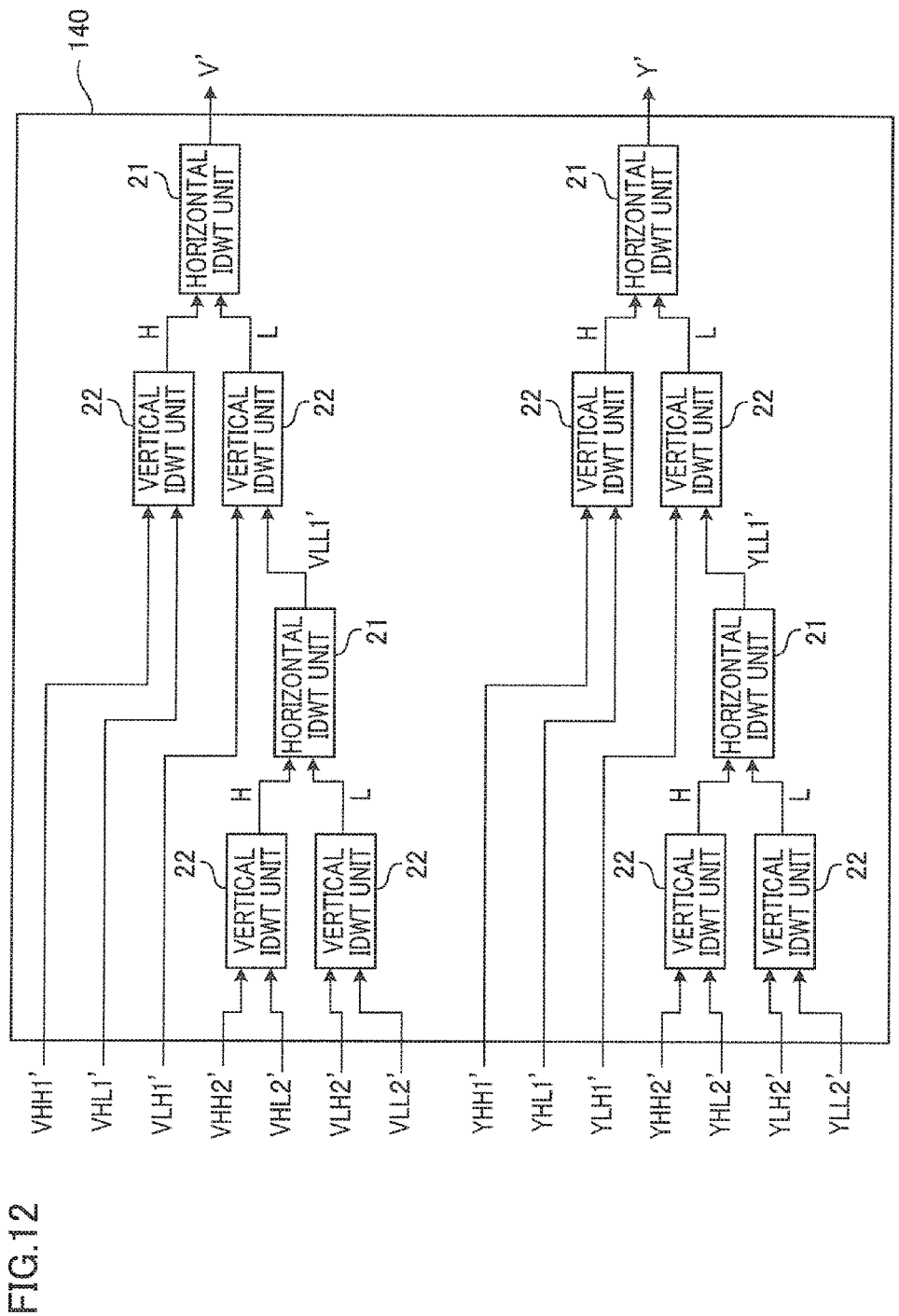
FIG. 12 is a block diagram illustrating a part of the circuit configuration of the decomposed image combining unit in FIG. 8, which part is for combining subimages, such as VHH1' and YLH2', on which the correcting process has been performed, to generate images V' and Y'.

As shown in FIG. 8, FIG. 11, and FIG. 12, the circuit configuring each of the decomposed image combining units 140 and 150 includes: one or more horizontal IDWT units 21 each configured to combine two subimages, i.e., a subimage of the high frequency component and a subimage of the low frequency component, with respect to the horizontal direction; and vertical IDWT units 22 each configured to combine two subimages, i.e., a subimage of the high frequency component and a subimage of the low frequency component, with respect to the vertical direction. The horizontal IDWT unit 21 combines subimages by performing the inverse transform to the transform performed by the horizontal DWT unit 11, on the subimages. The vertical IDWT unit 22 combines subimages by performing the inverse transform to the transform performed by the vertical DWT unit 12, on the subimages. The circuit configuration for each one-level inverse discrete wavelet transform is constituted by one horizontal IDWT unit 21 and two vertical IDWT units 22. The decomposed image combining unit 140 combines the subimages such as WHH1' and UHL2', to generate Y', U', V', and W' subimages. To implement this, a two-stage circuit configuration corresponding to that of the frequency decomposing unit 120 is provided to function as the decomposed image combining unit 140, as shown in FIG. 11 and FIG. 12. Note that the denotation with ' such as Y' means that the correcting process has been performed on the subimage.

For example, the circuit configuration for generating W' subimage is as follows. As shown in FIG. 11, one of the vertical IDWT units 22 at the first stage, into which WHH2' and WHL2' subimages are input, combines these subimages to generate H component. Meanwhile, the other of the vertical IDWT units 22 at the first stage, into which WLH2' and WLL2' subimages are input, combines these subimages to generate L component. Then, the H component and the L component generated by the respective vertical IDWT units 22 at the first stage are input to the horizontal IDWT unit 21 at the first stage. The horizontal IDWT unit 21 combines these components to generate WLL1' subimage. One of the vertical IDWT units 22 at the second stage, into which WHH1' and WHL1' subimages are input, combines these subimages to generate H component. The other of the vertical IDWT units 22 at the second stage, into which WLH1' and the WLL1' subimages are input, combines these subimages to generate L component. Then, the H component and the L component generated by the respective vertical IDWT units 22 at the second stage are input to the horizontal IDWT unit 21 at the second stage. The horizontal IDWT unit 21 at the second stage combines these components to generate W' subimage. Y', U', and V' subimages are generated in the same way.

The decomposed image combining unit 150 combines the Y', U', V', and W' subimages, to regenerate a single Bayer image. To implement this, a single circuit configuration corresponding to the frequency decomposing unit 110 is provided to function as the decomposed image combining unit 150, as shown in FIG. 8. One of the vertical IDWT units 22 combines the W' and U' subimages, to generate H component. The other of the vertical IDWT units 22 combines the V' and Y' subimages, to generate L component. The horizontal IDWT unit 21 combines the H and L components generated by the respective vertical IDWT units 22, to regenerate a Bayer image.

According to the first embodiment described above, in the filtering process (correcting process) performed by the correction processing unit 130 on the subimages, the set of filter coefficients used by the correction processing unit 130 for the subimages of the high frequency component representing color information is different from that for the subimages of the low frequency component representing brightness information. For example, as for the weight depending on the distance between pixels, the weight $w_{s1}$ is used for the YLL2 subimage and the like representing brightness information, while the weight $w_{s2}$ is used for the ULL2 subimage and the like representing color information. In addition, as for the weight depending on the difference between pixel values, the coefficient for $\sigma_R$ used for the subimages representing brightness information is different from that used for the subimages representing color information. In this way, the set of filter coefficients used for the subimages representing color information is different from that used for the subimages representing brightness information. Thus, the filtering process is performed on the subimages suitably in accordance with the characteristic of human visual perception that sensitivity to color information is different from the sensitivity to brightness information.

Further, according to the first embodiment, the frequency decomposing units 110 and 120 perform frequency decomposition using the discrete wavelet transform directly on a Bayer image. Thus, the amount of processed data is smaller than in the case where the frequency decomposition is performed on an image on which color interpolation has been performed, for example.

Furthermore, in the first embodiment, the frequency decomposing units 110 and 120 use the same filter coefficients to perform each-level discrete wavelet transform. That is, the frequency decomposing units 110 and 120 have the same frequency characteristics. In consequence, the decomposed image combining units 140 and 150 have the same frequency characteristics. This enables the following structure: the circuit configuration of the frequency decomposing unit 110 is the same as the circuit configuration at each stage of the frequency decomposing unit 120, and the circuit configuration of the decomposed image combining unit 140 is the same as the circuit configuration at each stage of the decomposed image combining unit 150, as shown in FIG. 8 to FIG. 12.

At least a part of or the whole of the frequency decomposing units 110 and 120, and at least a part of or the whole of the decomposed image combining units 140 and 150 may be implemented by the combination of hardware and software, instead of being implemented by hardware only. In this case, a CPU executes a program in accordance with a predetermined algorithm of the discrete wavelet transform, for example. In this process, because the frequency decomposing units 110 and 120 have the same frequency characteristics and the decomposed image combining units 140 and 150 have the same frequency characteristics, it is possible to build a program for computation of each-level discrete wavelet transform based on the same algorithm.

Second Embodiment

Figure 13:
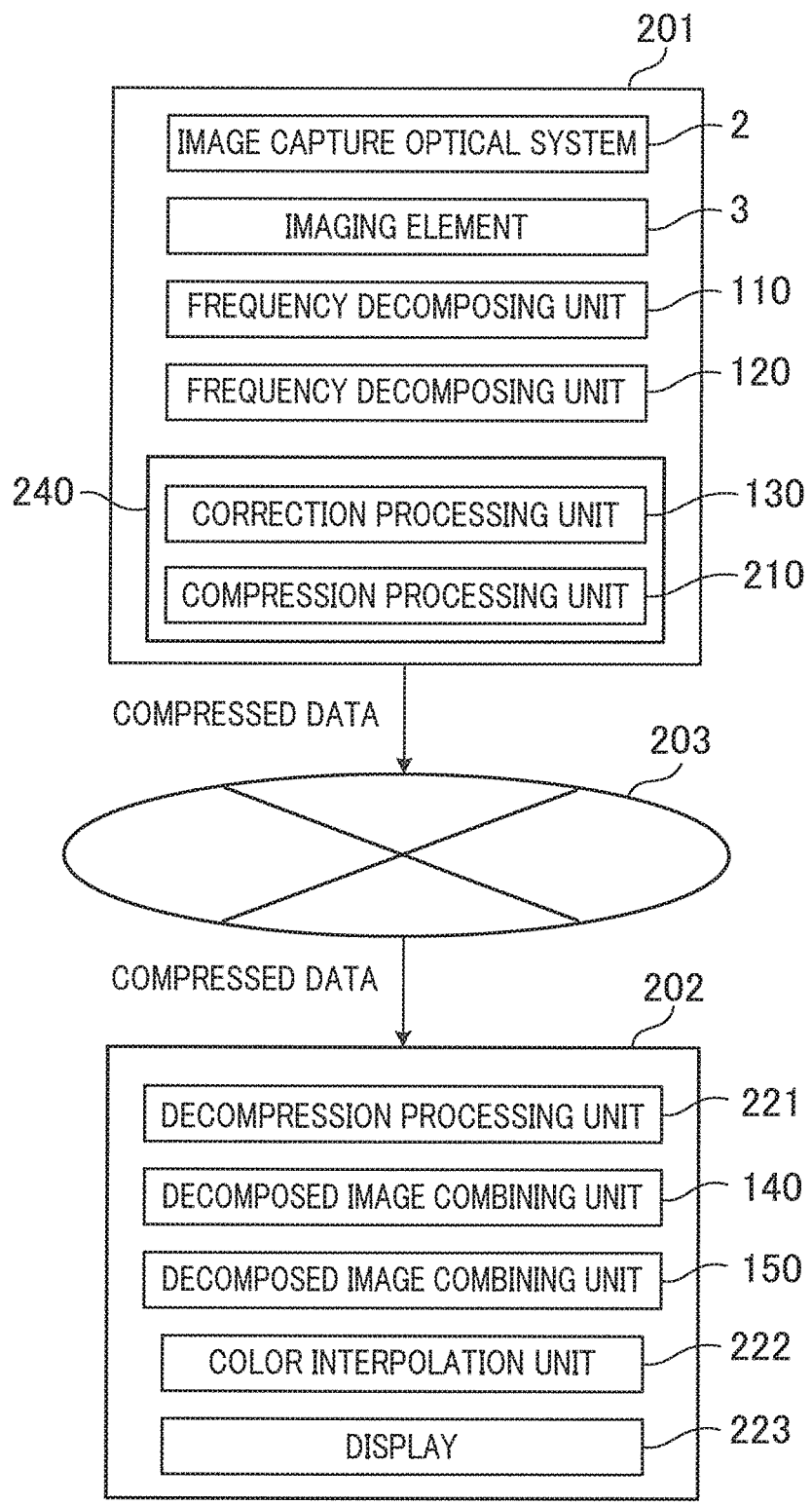
FIG. 13 is a block diagram illustrating the configuration of the second embodiment, which is another embodiment of the present invention.

The following will describe the second embodiment, which is another embodiment of the present invention. In the second embodiment, the elements same as those in the first embodiment are given the same reference numerals, and the description of these elements will be omitted. As shown in FIG. 13, an imaging device 201 of the second embodiment includes: the image capture optical system 2, the imaging element 3, the frequency decomposing unit 110, the frequency decomposing unit 120, and an image processor 240. The signal or image processing by the image capture optical system 2, the imaging element 3, the frequency decomposing unit 110, and the frequency decomposing unit 120 is the same as that in the first embodiment. The image processor 240 includes the correction processing unit 130 and a compression processing unit 210. The correcting process by the correction processing unit 130 is the same as that in the first embodiment. The compression processing unit 210 is configured to perform a compression process on each subimage on which the correction processing unit 130 has performed the correcting process. The compression process is performed in accordance with various types of compression technology for digital data. It is preferable that the compression processing unit 210 performs the compression process in such a manner that its processing details for the subimages of the high frequency component are different from its processing details for the subimages of the low frequency component. For example, the following processing is possible: a reversible compression technology is used for the YLL2 subimage, while an irreversible compression technology with high compression rate is used for the ULL2 subimage and the like, taking into consideration the characteristic of human visual perception of less sensitivity to the deterioration in the resolution of a color.

Unlike the first embodiment, the imaging device 201 outputs compressed data compressed by the compression processing unit 210 without combining the subimages. The compressed data is transmitted to an image display device 202 through a network 203 such as the Internet. The image display device 202 includes: a decompression processing unit 221, the decomposed image combining unit 140, the decomposed image combining unit 150, a color interpolation unit 222, and a display 223. The decompression processing unit 221 is configured to perform a decompression process on the compressed data transmitted from the imaging device 201. In the decompression process, the compressed data is decompressed to the original data in accordance with the decompression technology corresponding to the compression technology used in the compression process. The data decompressed by the decompression processing unit 221 is data for the subimages such as YHH1'. The subimages indicated by the data are combined by the decomposed image combining units 140 and 150, with the result that a Bayer image is regenerated. The color interpolation unit 222 is configured to interpolate pixel values in the Bayer image, to generate an image having pixel values of R, G, and B components. The display 223 is configured to display the image generated by the color interpolation unit 222.

According to this embodiment, an image taken by the imaging device 201 is transmitted to the image display device 202 in the form of subimages. Because of this, the amount of transmitted data is smaller. In addition, because the subimages are transmitted in the form of the compressed data, the amount of transmitted data is further smaller.

The correction processing unit 130 does not have to be provided in the image processor 240, and only the compression processing unit 210 may be provided in the image processor 240. In this case, it is preferable that the correction processing unit 130 is provided in the image display device 202, to perform the correcting process on data decompressed by the decompression processing unit 221. The compressed data may be output through another wired or wireless interface to another device, instead of the network 203. Further, the compressed data may be output to a computer-readable recording medium.

Other Modifications

The following will describe modifications of the above-described embodiments. In the above-described embodiments, the image processor 100 includes the correction processing unit 130, and the image processor 240 includes the compression processing unit 210. In addition to, or instead of, the correction processing unit 130 or the image processor 240, the image processor may include a characteristic amount computing unit which will be described below.

The characteristic amount computing unit is configured to compute the amount of characteristic of an image based on the subimages such as YHH1' and VLL2'. The amount of characteristic of an image may be, for example, parameters used in various types of image processing. Such parameters include parameters used in a correcting process and parameters used in a filtering process for enhancing the edge contrast of the image. Alternatively, the amount of characteristic of an image may be statistical values obtained by various types of statistical computations performed based on the subimages. Examples of the statistical values include $\sigma_N$ in the above-described embodiment. It is preferable that the characteristic amount computing unit computes the amount of characteristic in such a manner that the processing details of the computation for subimages of the high frequency component are different from the processing details of the computation for the subimages of the low frequency component. For example, in the processing of computing the amount of characteristic for the correcting process related to color information, ULL2 subimages and the like are considered, but YLL2 subimage is not considered. Meanwhile, in the processing of computing the amount of characteristic for the correcting process related to brightness information, YLL2 subimage is considered, but the other subimages are not considered. The results of the computation by the characteristic amount computing unit may be used in image processing by the imaging device itself, or may be output to another device, or to a recording medium.

In the above-described embodiments, the two frequency decomposing units 110 and 120 are provided; however, of these, only the frequency decomposing unit 110 may be provided. In this case, the image processor 100 performs image processing on subimages generated by the frequency decomposing unit 110. In this process, it is only required that there is a difference in the processing details of the image processing, between the image processing performed on the subimages of the high frequency component (U subimage and the like) and that performed on the subimage of the low frequency component (Y subimage), in response to the difference in the type of information, i.e., color information or brightness information.

Further, in the above-described embodiments, the frequency decomposing unit 120 performs the two-level discrete wavelet transform. In this regard, the frequency decomposing unit 120 may perform a one-level or three or more-level discrete wavelet transform. In the above embodiments, the frequency decomposing units 110 and 120 have the same frequency characteristics; however, the frequency decomposing units 110 and 120 may have frequency characteristics different from each other.

In the above-described embodiments, the type of the weight used for the filter coefficients in the correcting process is different depending on which of the low frequency component and the high frequency component the subimage represents. For example, the weight $w_{s1}$ is used for YLL2 subimage, while the weight $w_{s2}$ is used for ULL2 subimage and the like. There may be used another weight obtained by adding the two types weights in a predetermined ratio. Also in this case, it is preferable that a weight of which decrease rate in value depending on the distance between pixels is smaller than that of the weight for the low frequency component is used for the high frequency component. This is because human visual perception is relatively less sensitive to the deterioration in color information (the high frequency component), as described above.

Further, in the above-described embodiments, the correction processing unit 130 (filter coefficient obtaining unit 131) obtains the filter coefficients based on the predetermined $w_{s1}$, $w_{s2}$, and $\sigma_R$. However, the filter coefficients may be further adjusted based on shooting conditions. For example, in the case where the amount of noise included in an image changes also depending on the shooting conditions such as ISO sensitivity and temperatures at the time of shooting, the correction processing unit 130 may adjust the filter coefficient depending on the shooting conditions. In this case, the shooting conditions such as ISO sensitivity may be input from the outside of the imaging device. Alternatively, if the imaging device includes a controller configured to control the image capture optical system 2 and the imaging element 3, the shooting conditions may be output from the controller to the correction processing unit 130.

The above embodiments each deals with the case where the correction processing unit 130 performs the filtering process on each subimage once. However, the filtering process may be performed on each subimage twice or more. Further, in the above-described embodiments, the bilateral filter is used; however, another filter such as a trilateral filter may be used.

The above-described embodiments each deals with a case where the present invention is applied to the imaging device including the image capture optical system 2 and the imaging element 3. However, the present invention may be applied to an image processing device configured to perform image processing on a Bayer image generated in another imaging device including an image capture optical system, an imaging element, and the like. In this case, the image processing device does not have to include the image capture optical system 2 and the imaging element 3. The Bayer image from another device may be input from the imaging device to the image processing device through a network or through various types of wired/wireless interfaces, or through a recording medium. In this image processing device, a data reading unit configured to read data from the interface or the recording medium to obtain a Bayer image from outside corresponds to the image obtaining means in the present invention.

The compression processing unit 210 and the decompression processing unit 221 in the above-described second embodiment may be provided in the image processor 100 in the first embodiment. With this, the image processor 100 has function units respectively compressing and decompressing data. This enables data to be compressed and temporarily stored, leading to reduction in the capacity of a storage unit for temporarily storing data.

Each of the above-described embodiments and modifications includes, at least one of the following processes for image processing: the correcting process; the process of data compression and decompression; and the process of characteristic amount computation. As long as the processing details of the image processing for the high frequency component are different from those for the low frequency component in at least one of the above processes, any embodiments, modifications, and variations are within the scope of the present invention.

Other examples of application of the present invention include the application to three-dimensional noise reduction. The three-dimensional noise reduction is the process of removing noise based on comparison between frames from a moving image constituted by successive images in a plurality of frames. By performing three-dimensional noise reduction on subimages as in the present invention, the amount of buffer needed and the bandwidth needed are significantly reduced. For example, as compared with RGB 4:4:4 and YCbCr 4:4:4, these are reduced to ⅓, and as compared with YCbCr 4:2:0, these are reduced to ⅔.

In the image processing, correction may be performed on only the subimage representing brightness information (YLL2 subimage) by a gain cancelling brightness shading. This ensures that the effect of correcting the brightness shading is efficiently made on the whole image. In addition, because the correction is performed only on the YLL2 subimage, the size of the circuit is smaller. Furthermore, in the image processing, correction may be performed only on the subimages of the low frequency component (ULL2, VLL2, and WLL2 subimages) out of the subimages representing color information, by a gain cancelling color shading. This ensures that the effect of correcting the brightness shading is efficiently made on the whole image. In addition, because the correction is performed on only some of the subimages, the size of the circuit is smaller.

REFERENCE SIGNS LIST

1: imaging device, 100: image processor, 110: frequency decomposing unit, 120: frequency decomposing unit, 130: correction processing unit, 140: decomposed image combining unit, 150: decomposed image combining unit, 201: imaging device, 202: image display device, 210: compression processing unit, 240: image processor

The invention claimed is:

1. An image processing device comprising:
an image obtaining unit configured to obtain a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction;
a first frequency decomposing unit configured to decompose the Bayer image, with respect to each of the vertical direction and the horizontal direction, into a low frequency component representing brightness information and a high frequency component representing color information, thereby to generate a plurality of subimages;
a second frequency decomposing unit configured to perform one-level or multiple-level frequency decomposition on each of the subimages generated by the first frequency decomposing unit with respect to each of the vertical direction and the horizontal direction and thereby further decomposing each of the subimages into subimages having different frequency bands;
an image processing unit configured to perform at least one of the following processes for image processing of (i) a characteristic amount computation process of computing the amount of characteristic of the Bayer image based on the subimages obtained through frequency decomposition by the second frequency decomposing unit, (ii) a correcting process on one or more of the subimages obtained through the frequency decomposition, and (iii) a set of information compression and information decompression processes on one or more of the subimages obtained through the frequency decomposition, in such a manner that processing details of the at least one of the processes for the high frequency component are different from those for the low frequency component; and
first and second decomposed image combining units configured to combine the subimages having been generated by the first and second frequency decomposing units and processed by the image processing unit, to regenerate a single Bayer image.

2. The image processing device according to claim 1, wherein:
the first frequency decomposing unit and the second frequency decomposing unit have the same frequency characteristics; and
the first decomposed image combining unit and the second decomposed image combining unit have the same frequency characteristics.

3. The image processing device according to claim 1, wherein both of the first and second frequency decomposing units decompose the Bayer image into the subimages by means of a discrete wavelet transform.

4. An image processing device comprising:
an image obtaining unit configured to obtain a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction;
a frequency decomposing unit configured to decompose the Bayer image, with respect to each of the vertical direction and the horizontal direction, into a low frequency component representing brightness information and a high frequency component representing color information, thereby to generate a plurality of subimages;
an image processing unit configured to perform at least one of the following processes for image processing of (i) a characteristic amount computation process of computing the amount of characteristic of the Bayer image based on the subimages obtained through frequency decomposition by the frequency decomposing unit, (ii) a correcting process on one or more of the subimages obtained through the frequency decomposition, and (iii) a set of information compression and information decompression processes on one or more of the subimages obtained through the frequency decomposition, in such a manner that processing details of the at least one of the processes for the high frequency component are different from those for the low frequency component; and
a decomposed image combining unit configured to combine the subimages having been processed by the image processing unit, to regenerate a single Bayer image,
wherein the image processing unit comprises:
a filter obtaining unit configured to obtain first and second coefficient groups including a plurality of filter coefficients by which pixel values of pixels constituting each subimage before processed in the at least one of the processes are multiplied; and a filtering processing unit configured to filter the low frequency component using the first coefficient group obtained by the filter obtaining unit and filter the high frequency component using the second coefficient group obtained by the filter obtaining unit, the first coefficient group is obtained based on a first weight monotonously decreasing depending on a distance from a current pixel, and the second coefficient group is obtained based on a second weight monotonously decreasing depending on the distance from the current pixel at a decrease rate smaller than that of the first weight, or having no change depending on the distance from the current pixel.

5. The image processing device according to claim 4, wherein:

each first filter coefficient in the first coefficient group is a product of a function $w_{R1}$ and the first weight, the function $w_{R1}$ being expressed by below Equation 1 regarding a difference $D_{f1}$ in pixel value between the pixel corresponding to the first filter coefficient and the current pixel;

each second filter coefficient in the second coefficient group is a product of a function $w_{R2}$ and the second weight, the function $w_{R2}$ being expressed by below Equation 2 regarding a difference $D_{f2}$ in pixel value between the pixel corresponding to the second filter coefficient and the current pixel; and assuming that a standard value indicating a variation in the pixel value to given brightness is $\sigma_{N1}$ for the low frequency component and that the standard value for the high frequency component is $\sigma_{N2}$, $\sigma_{R1}$ and $\sigma_{R2}$ in Equations 1 and 2 are respectively expressed using coefficients $k_{N1}$ and $k_{N2}$ as $\sigma_{R1}=k_{N1}*\sigma_{N1}$ and $\sigma_{R2}=k_{N2}*\sigma_{N2}$, where $k_{N1}<k_{N2}$, $$w_{R1}(D_{f1}) = e^{-\frac{D_{f1}^2}{\sigma_{R1}^2}} \quad [\text{Equation 1}]$$

$$w_{R2}(D_{f2}) = e^{-\frac{D_{f2}^2}{\sigma_{R2}^2}}. \quad [\text{Equation 2}]$$

6. An image processing device comprising:

an image obtaining unit configured to obtain a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction;

a first frequency decomposing unit configured to decompose the Bayer image, with respect to each of the vertical direction and the horizontal direction, into a low frequency component representing brightness information and a high frequency component representing color information, thereby to generate a plurality of subimages;

a second frequency decomposing unit configured to perform one-level or multiple-level frequency decomposition on each of the subimages generated by the first frequency decomposing unit with respect to each of the vertical direction and the horizontal direction and thereby further decomposing each of the subimages into subimages having different frequency bands;

an image processing unit configured to perform at least one of the following processes for image processing of (i) a characteristic amount computation process of computing the amount of characteristic of the Bayer image based on the subimages obtained through frequency decomposition by the second frequency decomposing unit, (ii) a correcting process on one or more of the subimages obtained through the frequency decomposition, and (iii) an information compression process on one or more of the subimages obtained through the frequency decomposition, in such a manner that processing details of the at least one of the processes for the high frequency component are different from those for the low frequency component; and an output unit configured to output at least one of (i) the subimages on which the at least one of the processes for image processing has been performed by the image processing unit and (ii) the amount of characteristic.

7. An image processing device, comprising:

an image obtaining unit configured to obtain a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction;

a frequency decomposing unit configured to decompose the Bayer image, with respect to each of the vertical direction and the horizontal direction, into a low frequency component representing brightness information and a high frequency component representing color information, thereby to generate a plurality of subimages;

an image processing unit configured to perform at least one of the following processes for image processing of (i) a characteristic amount computation process of computing the amount of characteristic of the Bayer image based on the subimages obtained through frequency decomposition by the frequency decomposing unit, (ii) a correcting process on one or more of the subimages obtained through the frequency decomposition, and (iii) an information compression process on one or more of the subimages obtained through the frequency decomposition, in such a manner that processing details of the at least one of the processes for the high frequency component are different from those for the low frequency component; and an output unit configured to output at least one of (i) the subimages on which the at least one of the processes for image processing has been performed by the image processing unit and (ii) the amount of characteristic, wherein the image processing unit comprises:

a filter obtaining unit configured to obtain first and second coefficient groups including a plurality of filter coefficients by which pixel values of pixels constituting each subimage before processed in the at least one of the processes are multiplied; and a filtering processing unit configured to filter the low frequency component using the first coefficient group obtained by the filter obtaining unit and filter the high frequency component using the second coefficient group obtained by the filter obtaining unit, the first coefficient group is obtained based on a first weight monotonously decreasing depending on a distance from a current pixel, and the second coefficient group is obtained based on a second weight monotonously decreasing depending on the distance from the current pixel at a decrease rate smaller than that of the first weight, or having no change depending on the distance from the current pixel.

8. An image processing method comprising:

an image obtaining step of obtaining a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction;

a first frequency decomposing step of decomposing the Bayer image, with respect to each of the vertical direction and the horizontal direction, into a low frequency component representing brightness information and a high frequency component representing color information, thereby to generate a plurality of subimages;

a second frequency decomposing step of performing one-level or multiple-level frequency decomposition on each of the subimages generated in the first frequency decomposing step with respect to each of the vertical direction and the horizontal direction and thereby further decomposing each of the subimages into subimages having different frequency bands;

an image processing step of performing at least one of the following processes for image processing of (i) a characteristic amount computation process of computing the amount of characteristic of the Bayer image based on the subimages obtained through frequency decomposition in the second frequency decomposing step, (ii) a correcting process on one or more of the subimages obtained through the frequency decomposition, and (iii) a set of information compression and information decompression processes on one or more of the subimages obtained through the frequency decomposition, in such a manner that processing details of the at least one of the processes for the high frequency component are different from those for the low frequency component; and first and second decomposed image combining steps of combining the subimages after the first and second frequency decomposing steps and the image processing step, to regenerate a single Bayer image.

9. An image processing method comprising:

an image obtaining step of obtaining a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction;

a frequency decomposing step of decomposing the Bayer image, with respect to each of the vertical direction and the horizontal direction, into a low frequency component representing brightness information and a high frequency component representing color information, thereby to generate a plurality of subimages;

an image processing step of performing at least one of the following processes for image processing of (i) a characteristic amount computation process of computing the amount of characteristic of the Bayer image based on the subimages obtained through frequency decomposition in the frequency decomposing step, (ii) a correcting process on one or more of the subimages obtained through the frequency decomposition, and (iii) a set of information compression and information decompression processes on one or more of the subimages obtained through the frequency decomposition, in such a manner that processing details of the at least one of the processes for the high frequency component are different from those for the low frequency component; and a decomposed image combining step of combining the subimages after the image processing step, to regenerate a single Bayer image, wherein the image processing step comprises:

a filter obtaining step of obtaining first and second coefficient groups including a plurality of filter coefficients by which pixel values of pixels constituting each subimage before processed in the at least one of the processes are multiplied; and a filtering processing step of filtering the low frequency component using the first coefficient group obtained in the filter obtaining step and filtering the high frequency component using the second coefficient group obtained in the filter obtaining step, the first coefficient group is obtained based on a first weight monotonously decreasing depending on a distance from a current pixel, and the second coefficient group is obtained based on a second weight monotonously decreasing depending on the distance from the current pixel at a decrease rate smaller than that of the first weight, or having no change depending on the distance from the current pixel.

10. A non-transitory computer-readable recording medium recording thereon a computer program causing a computer to execute the following steps of:

an image obtaining step of obtaining a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction;

a first frequency decomposing step of decomposing the Bayer image, with respect to each of the vertical direction and the horizontal direction, into a low frequency component representing brightness information and a high frequency component representing color information, thereby to generate a plurality of subimages;

a second frequency decomposing step of performing one-level or multiple-level frequency decomposition on each of the subimages generated in the first frequency decomposing step with respect to each of the vertical direction and the horizontal direction and thereby further decomposing each of the subimages into subimages having different frequency bands;

an image processing step of performing at least one of the following processes for image processing of (i) a characteristic amount computation process of computing the amount of characteristic of the Bayer image based on the subimages obtained through frequency decomposition in the second frequency decomposing step, (ii) a correcting process on one or more of the subimages obtained through the frequency decomposition, and (iii) a set of information compression and information decompression processes on one or more of the subimages obtained through the frequency decomposition, in such a manner that processing details of the at least one of the processes for the high frequency component are different from those for the low frequency component; and first and second decomposed image combining steps of combining the subimages after the first and second frequency decomposing steps and the image processing step, to regenerate a single Bayer image.

11. A non-transitory computer-readable recording medium recording thereon a computer program causing a computer to execute the following steps of:

an image obtaining step of obtaining a Bayer image in a Bayer array constituted by first rows in each of which red and green pixels are alternately arranged in a horizontal direction and second rows in each of which green and blue pixels are alternately arranged in the horizontal direction, the first rows and the second rows being alternately arranged in a vertical direction;

a frequency decomposing step of decomposing the Bayer image, with respect to each of the vertical direction and the horizontal direction, into a low frequency component representing brightness information and a high frequency component representing color information, thereby to generate a plurality of subimages;

an image processing step of performing at least one of the following processes for image processing of (i) a characteristic amount computation process of computing the amount of characteristic of the Bayer image based on the subimages obtained through frequency decomposition in the frequency decomposing step, (ii) a correcting process on one or more of the subimages obtained through the frequency decomposition, and (iii) a set of information compression and information decompression processes on one or more of the subimages obtained through the frequency decomposition, in such a manner that processing details of the at least one of the processes for the high frequency component are different from those for the low frequency component; and a decomposed image combining step of combining the subimages after the image processing step, to regenerate a single Bayer image, wherein the image processing step comprises:

a filter obtaining step of obtaining first and second coefficient groups including a plurality of filter coefficients by which pixel values of pixels constituting each subimage before processed in the at least one of the processes are multiplied; and a filtering processing step of filtering the low frequency component using the first coefficient group obtained in the filter obtaining step and filtering the high frequency component using the second coefficient group obtained in the filter obtaining step, the first coefficient group is obtained based on a first weight monotonously decreasing depending on a distance from a current pixel, and the second coefficient group is obtained based on a second weight monotonously decreasing depending on the distance from the current pixel at a decrease rate smaller than that of the first weight, or having no change depending on the distance from the current pixel.

* * * * *